United States Patent [19]

Nelson

[11] 3,838,797
[45] Oct. 1, 1974

[54] PREPOSITIONING DEVICE FOR A BLEND CONTROL VALVE
[75] Inventor: Dana W. Nelson, Dexter, Ohio
[73] Assignee: Dresser Industries, Inc., Dallas, Tex.
[22] Filed: Jan. 11, 1971
[21] Appl. No.: 105,379

[52] U.S. Cl. .............................................. 222/134
[51] Int. Cl. ............................................ B67d 5/56
[58] Field of Search .............................. 222/134, 26

[56] References Cited
UNITED STATES PATENTS

| | | | |
|---|---|---|---|
| 2,931,538 | 4/1960 | Young et al. | 222/134 X |
| 2,996,221 | 8/1961 | Grise | 222/134 X |
| 2,997,209 | 8/1961 | Daniele | 222/134 X |
| 3,184,108 | 5/1965 | Grau | 222/134 X |
| 3,195,780 | 7/1965 | Garland et al. | 222/134 |

Primary Examiner—Robert B. Reeves
Assistant Examiner—Frederick R. Handren
Attorney, Agent, or Firm—Roy L. Van Winkle; John N. Hazelwood

[57] ABSTRACT

An apparatus for presetting the valving mechanism of a blending dispenser comprising a blend selector with a cam connected thereto for movement with the selector to positions representative of the various blend selections, a cam follower arrangement in engagement with the cam having a free end portion the positions of which are representative of the various blend selections, and a releasable clamping assembly for coupling the free end portion of the cam follower arrangement to the valving mechanism during selection of the blend so that the valving mechanism is preset to a position that effects delivery of the blend selected.

6 Claims, 6 Drawing Figures

PATENTED OCT 1 1974

3,838,797

PATENTED OCT 1 1974 3,838,797

3,838,797

PREPOSITIONING DEVICE FOR A BLEND CONTROL VALVE

BACKGROUND OF THE INVENTION

The present invention relates to an apparatus for presetting the valving mechanism of a blending dispenser, and more particularly to a valve presetting device that operates in conjunction with the blend selector of the dispenser.

Prior to the present invention several gasoline blending dispensers have been disclosed wherein various ratios of base and additive gasoline components can be dispensed. These blenders usually require a small quantity of gasoline to be dispensed that is not proportioned at the selected blend ratio while the control valve is seeking the proper location to dispense the selected ratio. This occurs each time the blend selection is changed. Thus, at the beginning of a dispensing operation the valving mechanism may be set for a different proportioning than that which is desired thereby causing a small amount of fuel of the previous ratio to be dispensed during readjustment of the valve setting.

Accordingly, it is an object of the present invention to provide a simple and automatic apparatus for presetting the valving mechanism of a blending dispenser which functions in a highly satisfactory and beneficial manner.

SUMMARY OF THE INVENTION

In accordance with the present invention an apparatus is provided for presetting the valving mechanism of a blending dispenser comprising a blend selector with a cam connected to the selector for movement therewith to positions representative of the various blend selections. A cam follower arrangment moves with the cam, and the follower arrangement has a free end portion the positions of which are representative of the various blend selections. A releasable clamping assembly is provided for coupling the free end portion of the cam follower arrangement to the valving mechanism during selection of the blend so that the valving mechanism is preset to a position that effects delivery of the blend selected.

The cam may include a cam slot, and the cam follower arrangement may have a pin that rides in the slot to thereby locate the free end portion of the cam follower arrangement at positions representative of the various blend selections. Moreover, the cam follower arrangement may comprise an L-shaped lever with the pin at the end of the lever remote from its free end portion.

The releasable clamping assembly of the present invention comprises a pair of arms pivotally connected together at one end thereof. The opposite ends of the arms include terminal portions that engage the free end portion of the cam follower arrangement and the valving mechanism to couple them together during selection of the blend. Additionally, a biasing device can be connected between the arms of the releasable clamping assembly to urge the terminal portions together.

The apparatus of the present invention may also include a mechanism for locking the blend selector in place at the start of a dispensing operation with a linkage connected thereto that includes a roller positioned between the arms of the releasable clamping assembly for spreading them apart when the mechanism locks the blend selector in place. Accordingly, the free end portion of the cam follower arrangement is uncoupled from the valving mechanism during the dispensing operation.

BRIEF DESCRIPTION OF THE DRAWING

Novel features and advantages of the present invention will become apparent to one skilled in the art from a reading of the following detailed description in conjunction with the accompanying drawing wherein similar reference characters refer to similar parts and in which.

DETAILED DESCRIPTION OF THE INVENTION

Figure 1:
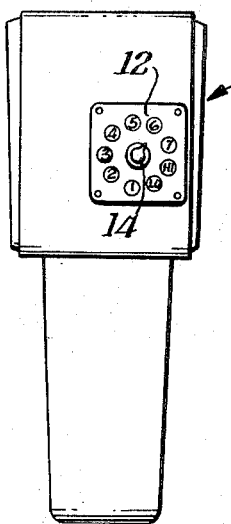
FIG. 1 is a side elevational view of a gasoline dispenser housing.
Figure 2:
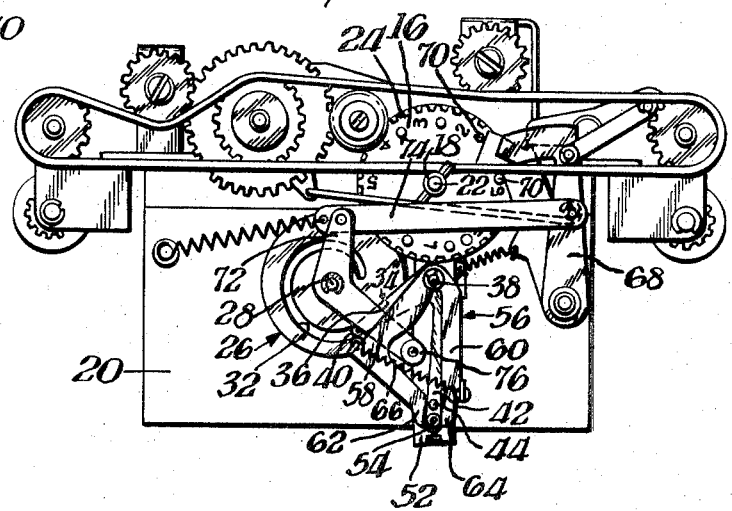
FIG. 2 is an elevational view of an apparatus according to the present invention.

FIG. 1 illustrates a gasoline dispenser 10 for blending a variety of gasoline mixtures from two gasoline sources. In many respects the dispenser is similar to the blenders disclosed in Young U.S. Pat. Nos. 2,880,908 and 2,977,970, granted Apr. 7, 1959, and Apr. 4, 1961, respectively. The dispenser 10 has a blend selector panel 12 with nine gasoline blends indicated on the panel. A blend selector knob 14 located in the center of the panel, as shown in FIG. 1, is easily moved to the desired gasoline blend by simply rotating the knob so that the pointer portion is directed toward the desired blend. Rotation of the blend selector knob prepositions the blend control valve of the dispenser, and subsequent operation of the dispenser effects immediate delivery of the approximate blend selected.

In accordance with the present invention, a blend selector disc 16 is mounted upon the blend selector shaft 18 of the dispenser 10. The shaft 18 is journaled to the framework 20 of the dispenser and its free end 22 carries the blend selector knob 14. Movement of the knob to one of the blend selections indicated on the selector panel 12 causes the blend selector disc 16 to move with it. As clearly evident from the drawing, the blend selector disc comprises an index spur gear with gear teeth 24 at the periphery of the disc.

A box cam 26 is journaled to the framework 20 of the dispenser 10 by a shaft 28. A gear 30 fixed to the box cam 26 is in meshing engagement with the teeth 24 of the blend selector disc 16 so that movement of the disc causes simultaneous movement of the box cam. Moreover, the box cam includes a cam track 32 in the form of a spiral groove.

A cam follower arrangement 34 is connected for movement with the box cam 26. The follower arrangement 34 comprises an L-shaped lever 36 journaled to a shaft 38 secured to the framework 20 of the dispenser 10. One end of the L-shaped lever carries a pin 40 which rides in the cam track 32 of the box cam 26. The opposite or free end portion 42 of the L-shaped lever 36 carries a projection 44, for reasons described more fully below.

As can readily be understood at this point, movement of the blend selector disc 16 causes the box cam 26 to move to positions which are representative of the various blend selections indicated on the blend selector panel 12. The cam follower arrangement 34 being connected to the box cam 26 moves along with the cam as the selector disc is rotated. The spiral cam track 32 functions to position the free end portion 42 of the L-shaped lever 36 at a location which is representative of the selected blend. The particular configuration of the cam track 32 positions the free end portion 42 of the L-shaped lever 36 at a variety of different locations, each of which is representative of one of the various blend selections.

Figure 3:
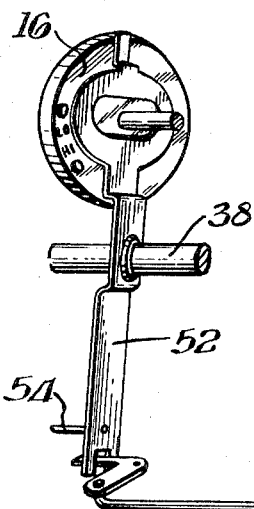
FIG. 3 is a perspective view of a linkage arrangement utilized to preset the valve of a gasoline dispenser according to the present invention.
Figure 3:
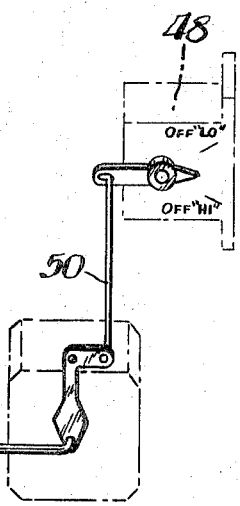
Figure 4:
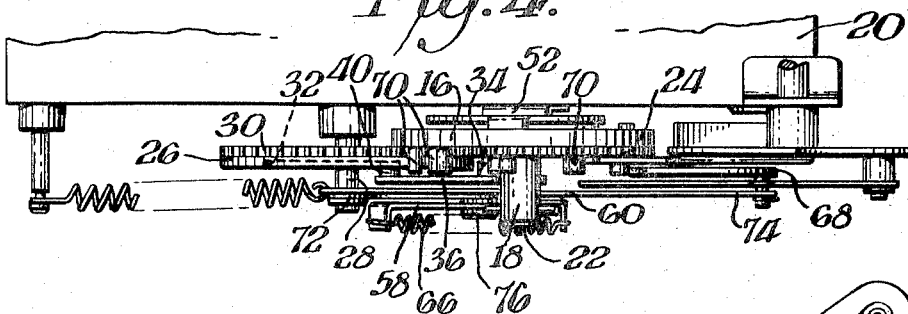
FIG. 4 is a top plan view of a portion of the apparatus shown in FIG. 2.
Figure 5:
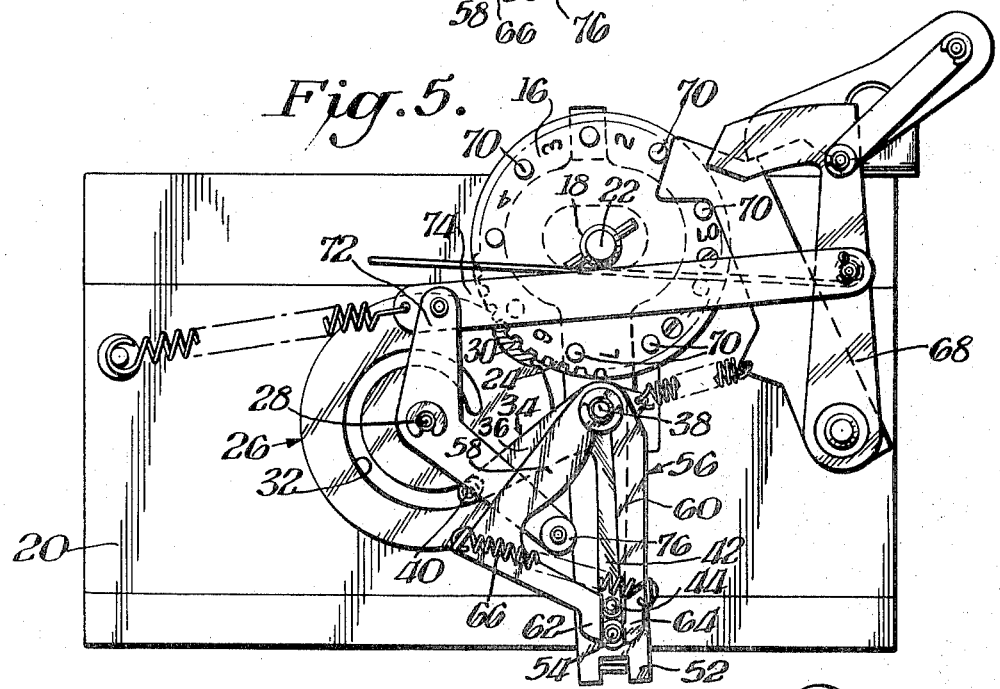
FIG. 5 is an elevational view similar to FIG. 2 illustrating the positions of the various mechanism prior to delivery.
Figure 6:
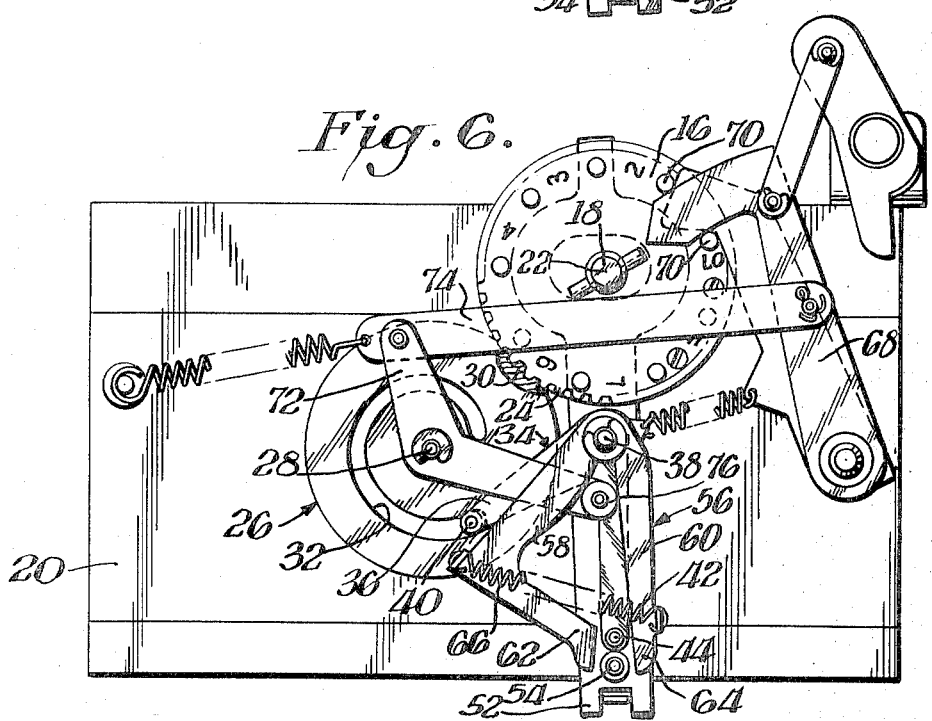
FIG. 6 is an elevational view similar to FIG. 5 showing the positions of the various mechanisms after the blend has been selected and the blend selector locked in place.

Referring to FIG. 3, the dispenser 10 of the present invention includes a valving mechanism 46 comprising a blend control valve 48 and a train of linkage 50 connected to the valve for controlling its position. The position of the blend control valve 48 controls the ratio of the gasoline components dispensed. The linkage 50 is connected to a rocker arm 52 which is pivotally mounted to the framework 20 of the dispenser 10 by the shaft 38. Thus, movement of the rocker arm 52 about its pivot point causes the linkage 50 to change the setting of the blend control valve 48. The rocker arm 52 includes a pin or projection 54 at its lower end, and the pin 54 is located slightly below the projection 44 on the free end 42 of the L-shaped lever 36.

A releasable clamping mechanism 56 is provided for coupling the projection 44 on the L-shaped lever 36 to the pin 54 on the rocker arm 52. The clamping mechanism 56 comprises a pair of arms 58, 60, each of which is pivotally connected to the framework 20 of the dispenser 10 by the shaft 38. Together these arms comprise scissors having terminal portions 62, 64 urged toward one another by a biasing device 66 in the form of a coil spring. Thus, the clamping mechanism 56 operates to couple the L-shaped lever 36 of the cam follower arrangement 34 to the rocker arm 52 of the valving mechanism 46 so that movement of the lever in response to rotation of the blend selector disc causes movement of the rocker arm. The rocker arm being connected to the linkage 50 operates to preposition the blend control valve 48 at the setting which effects delivery of the blend selected.

As described in more detail in applicant's U.S. Pat. No. 3,424,348, granted Jan. 28, 1969, the dispenser 10 also includes a blend control unit interlock which prevents changes of the blend during a dispensing operation. For the purposes of this application a detailed description of the interlock is not necessary and all that is required is knowledge of the fact that this interlock includes a blend selector release latch 68 which is positioned between selected pins 70 on the blend selector disc 16 at the start of a dispensing operation. Thus, the blend selector disc is locked in place by the latch 68 so that blend changes are prevented during the dispensing operation.

As shown in the drawing, the blend selector release latch 68 is connected to a lever 72 by a rod 74. The lever 72 is pivotally connected to the framework 20 of the dispenser 10 by the shaft 28 that secures the box cam 26 to the dispenser framework. The opposite end of the lever 72 carries a roller 76 which is located between the arms 58, 60 of the clamping mechanism 56. As can readily be understood, movement of the release latch 68 to its locking position between selected pins 70 on the blend selector disc 16 causes the lever 72 to rotate in a counterclockwise direction about its pivot point. This causes the roller 76 to move in an upward direction thereby engaging the arms 58, 60 of the clamping mechanism 56 and moving them apart so that the terminal portions 62, 64 of the arms move away from each other. Hence, the valving mechanism 46 is uncoupled from the blend selector components.

In operation, movement of the blend selector disc functions to position the projection 44 at the free end 42 of the L-shaped lever 36 at a location which is representative of the position of the blend selector disc and therefore representative of the particular blend selected. Since the pin 54 on the rocker arm 52 is coupled to the projection 44 on the L-shaped lever 36 prior to actual dispensing movement of the projection 44 causes the rocker arm to move with the cam follower arrangement 34. The rocker arm then shifts the linkage 50 of the valving mechanism 46 so as to preset the blend control valve 48 at a position which effects delivery of the blend selected.

Next, the control lever for the dispenser is actuated which forces the release latch 68 between selected pins 70 on the blend selector disc 16 thereby locking the disc in place. Movement of the release latch to its locking position also causes the roller 76 to move in an upward direction between the arms 58, 60 of the clamping mechanism 56. This causes the terminal portions 62, 64 of the clamping mechanism to move away from each other thereby uncoupling the rocker arm 52 from the blend selector components.

Such uncoupling enables a subtract differential to control the position of the blend control valve 48 during actual dispensing, as is the case with most conventional blenders. The subtract differential is not illustrated and this mechanism is described in detail in each of the above mentioned Young patents. Basically, it assures proper location of the blend control valve during the actual dispensing operation.

Thus, the present invention functions to preset the blend control valve at a position that effects delivery of the blend selected. This is done prior to dispensing. Once the dispensing operation is started, however, the subtract differential is in full control of the blend control valve to assure dispensing of the selected ratio of gasoline components.

What is claimed is:

1. An apparatus for presetting the valving mechanism of a blending dispenser comprising a blend selector, cam means connected to the blend selector for movement therewith to positions representative of the various blend selections, cam follower means including a cam engaging portion in cooperative engagement with the cam means and having a free end portion the positions of which are representative of the various blend selections, and releasable clamping means for coupling the free end portion of the cam follower means to the valving mechanism during selection of the blend whereby the valving mechanism is preset to a position that effects delivery of the blend selected, said clamping means positively releasing the free end portion of the cam follower means from the valving mechanism upon backing of the blend selector after selection of the blend whereby the valving mechanism can be adjusted to maintain delivery of the selected blend.

2. An apparatus for presetting the valving mechanism of a blending dispenser comprising a blend selector, cam means connected to the blend selector for movement therewith to positions representative of the various blend selections, cam follower means in engagement with the cam means having a free end portion the positions of which are representative of the various blend selections, and releasable clamping means for coupling the free end portion of the cam follower means to the valving mechanism during selection of the blend whereby the valving mechanism is preset to a position that effects delivery of the blend selected and for releasing the free end of the cam follower means from the valving mechanism after selection of the blend whereby the valving mechanism can be adjusted to maintain delivery of the selected blend, and said cam means includes a cam slot, and said cam follower means includes a pin that rides in said slot to locate the free end portion of said cam follower means at positions representative of the various blend selections.

3. An apparatus as in claim 2 wherein the cam follower means comprises an L-shaped lever with the pin at the end of the lever remote from its free end portion.

4. An apparatus for presetting the valving mechanism of a blending dispenser comprising a blend selector, cam means connected to the blend selector for movement therewith to positions representative of the various blend selections, cam follower means in engagement with the cam means having a free end portion the positions of which are representative of the various blend selections, and releasable clamping means for coupling the free end portion of the cam follower means to the valving mechanism during selection of the blend whereby the valving mechanism is preset to a position that effects delivery of the blend selected, said releasable clamping means comprising a pair of arms pivotally connected together at one end thereof, the opposite end of the arms including terminal portions that engage the free end portions of the cam follower means and the valving mechanism to couple them together during selection of the blend.

5. An apparatus as in claim 4 including biasing means connected between the arms of the releasable clamping means for urging the terminal portions of the arms together.

6. An apparatus as in claim 5 including means for locking the blend selector at the selected blend prior to the dispensing operation, and a linkage assembly connected to the locking means including a roller positioned between the arms of the releasable clamping means for spreading them apart when the blend selector is locked in place whereby the free end portion of the cam follower means is uncoupled from the valving mechanism during the dispensing operation.

* * * * *

UNITED STATES PATENT OFFICE
CERTIFICATE OF CORRECTION

PATENT NO. : 3,838,797
DATED : October 1, 1974
INVENTOR(S) : Dana W. Nelson

It is certified that error appears in the above-identified patent and that said Letters Patent are hereby corrected as shown below:

Claim 1, column 4, line 67, "backing" should be "locking".

Signed and Sealed this twenty-ninth Day of July 1975

[SEAL]

Attest:

RUTH C. MASON
Attesting Officer

C. MARSHALL DANN
Commissioner of Patents and Trademarks